No. 894,287. PATENTED JULY 28, 1908.
C. & A. RENARD.
POWER LOOM FOR THE MANUFACTURE OF TUFTED PILE FABRICS.
APPLICATION FILED AUG. 17, 1906.
10 SHEETS—SHEET 1.
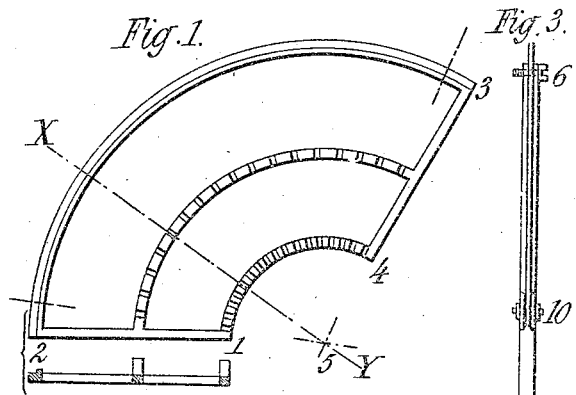
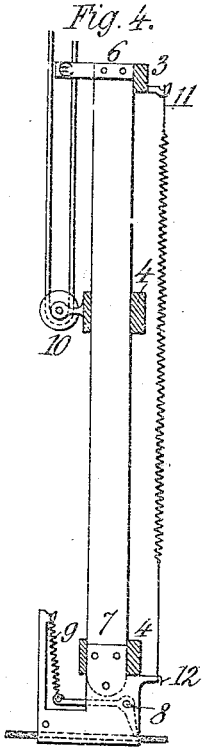
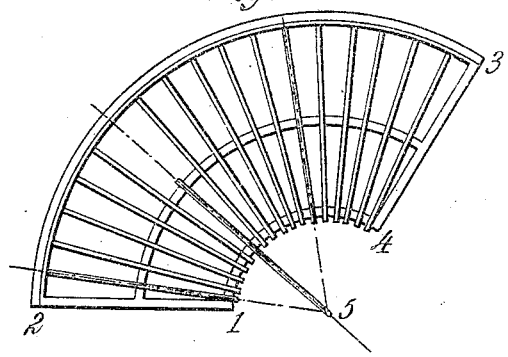
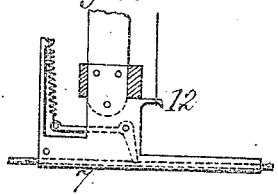
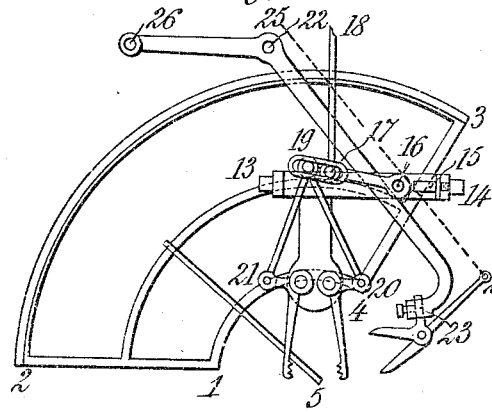
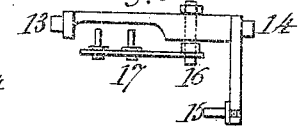
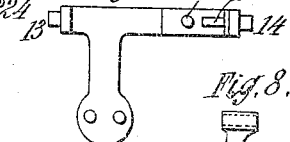
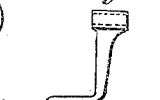
WITNESSES:
René Nuine
William F. Martinez
INVENTORS:
Charles Renard and Albert Renard
By Attorneys
Arthur C. Fraser & Usina No. 894,287. PATENTED JULY 28, 1908.
C. & A. RENARD.
POWER LOOM FOR THE MANUFACTURE OF TUFTED PILE FABRICS.
APPLICATION FILED AUG. 17, 1906.
10 SHEETS—SHEET 2.
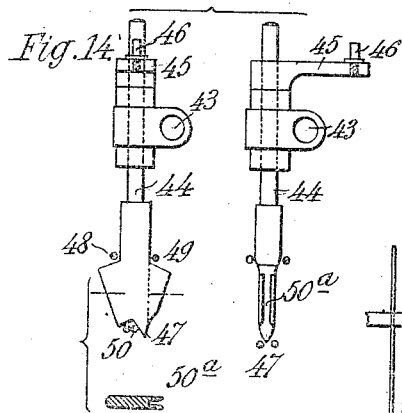
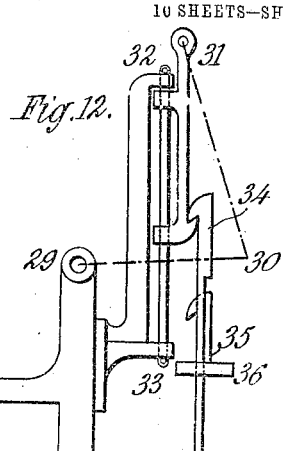
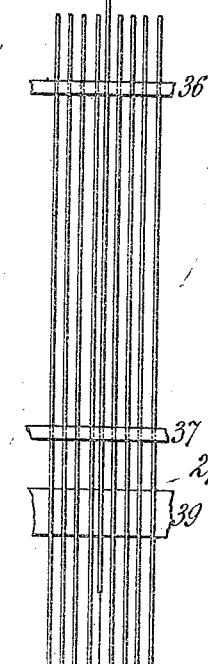
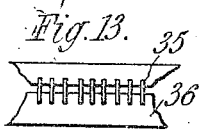
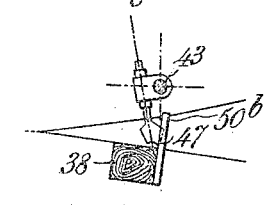
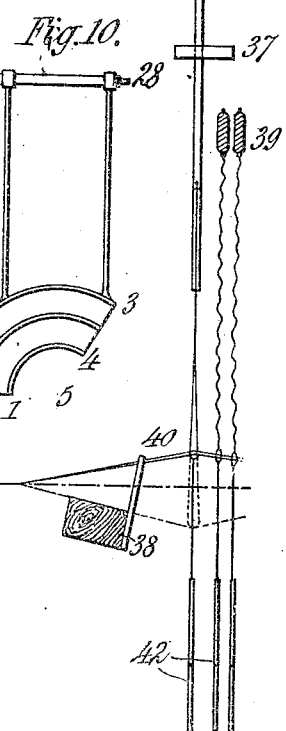
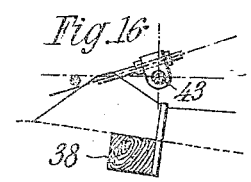
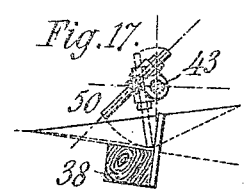
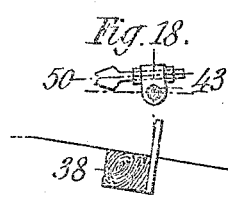
WITNESSES:
René Bruine
William F. Martinez
INVENTORS:
Charles Renard and Albert Renard
By Attorneys,
Arthur C. Fraser & Usina

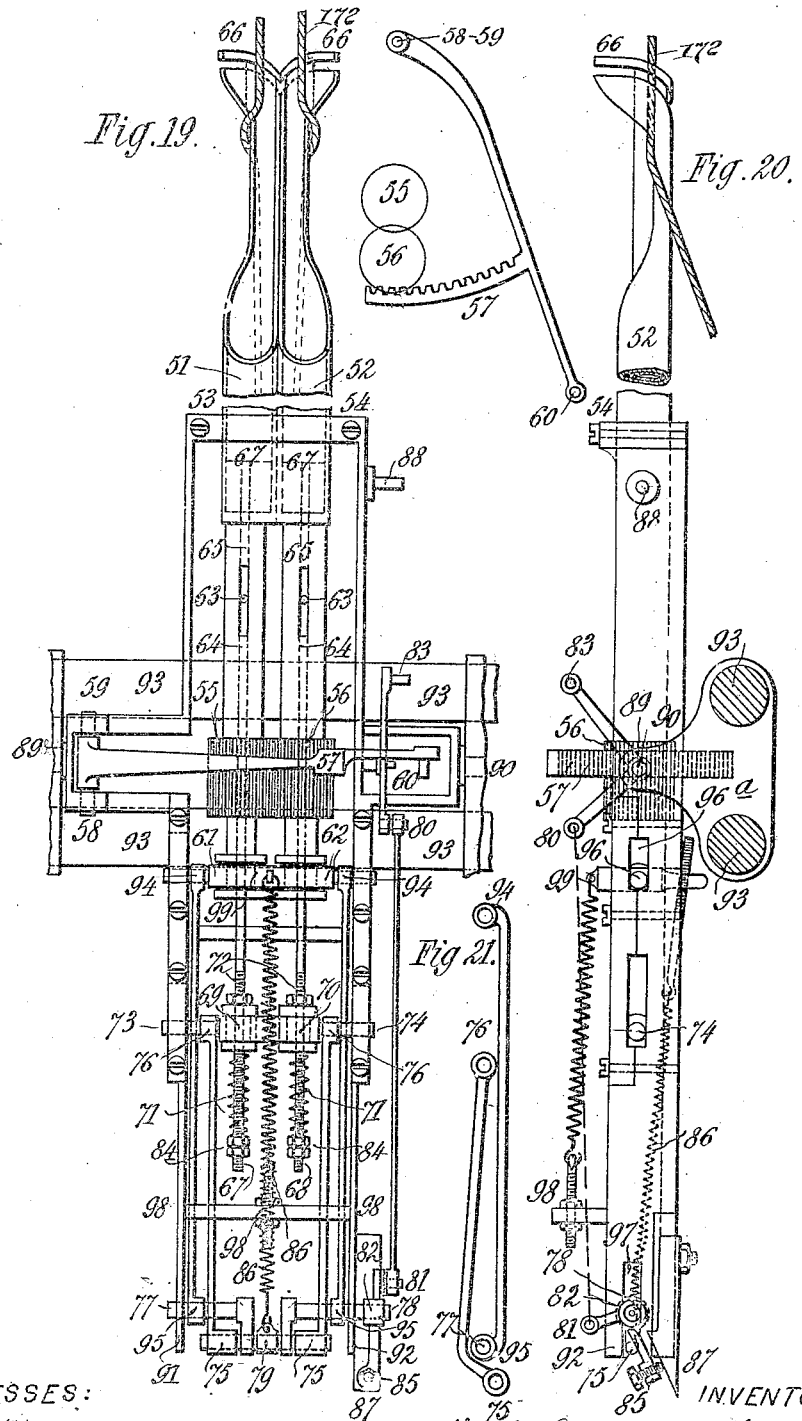

No. 894,287. PATENTED JULY 28, 1908.
C. & A. RENARD.
POWER LOOM FOR THE MANUFACTURE OF TUFTED PILE FABRICS.
APPLICATION FILED AUG. 17, 1906.
10 SHEETS—SHEET 4.
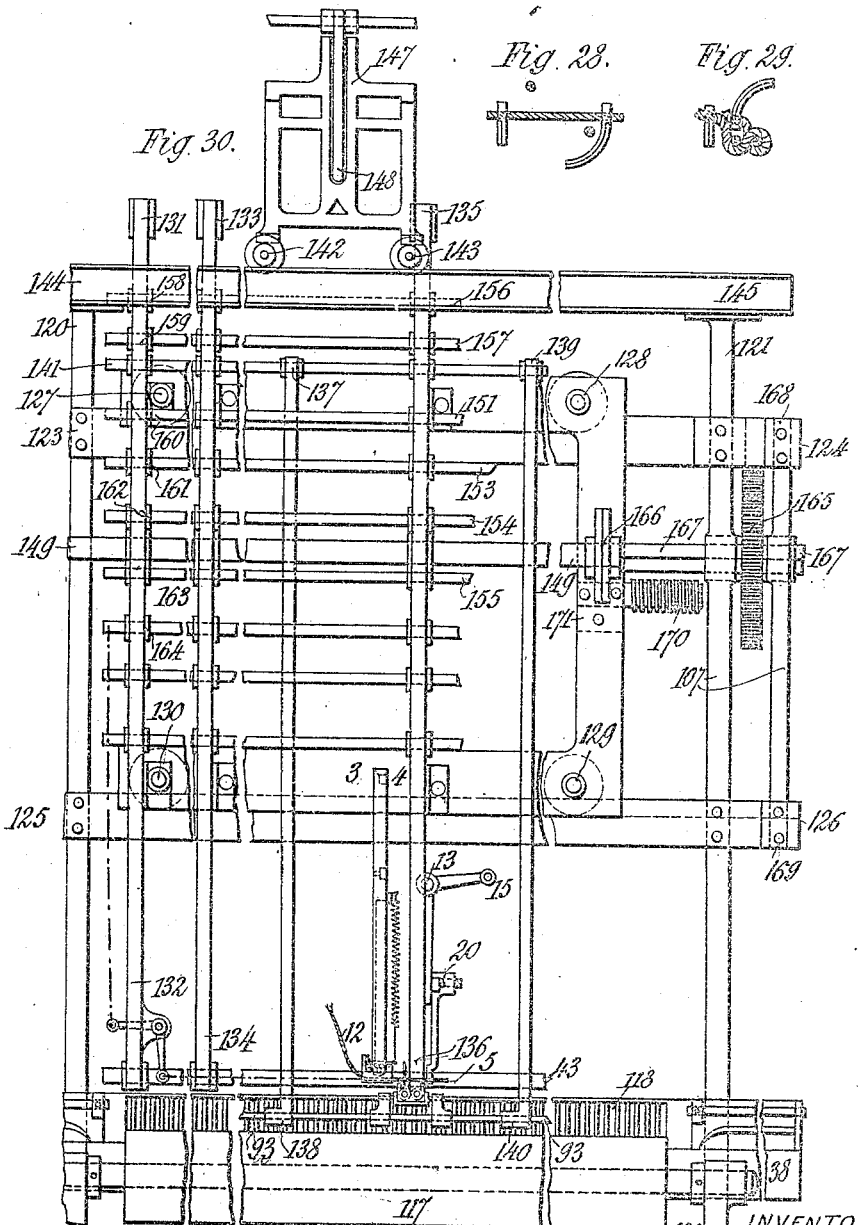

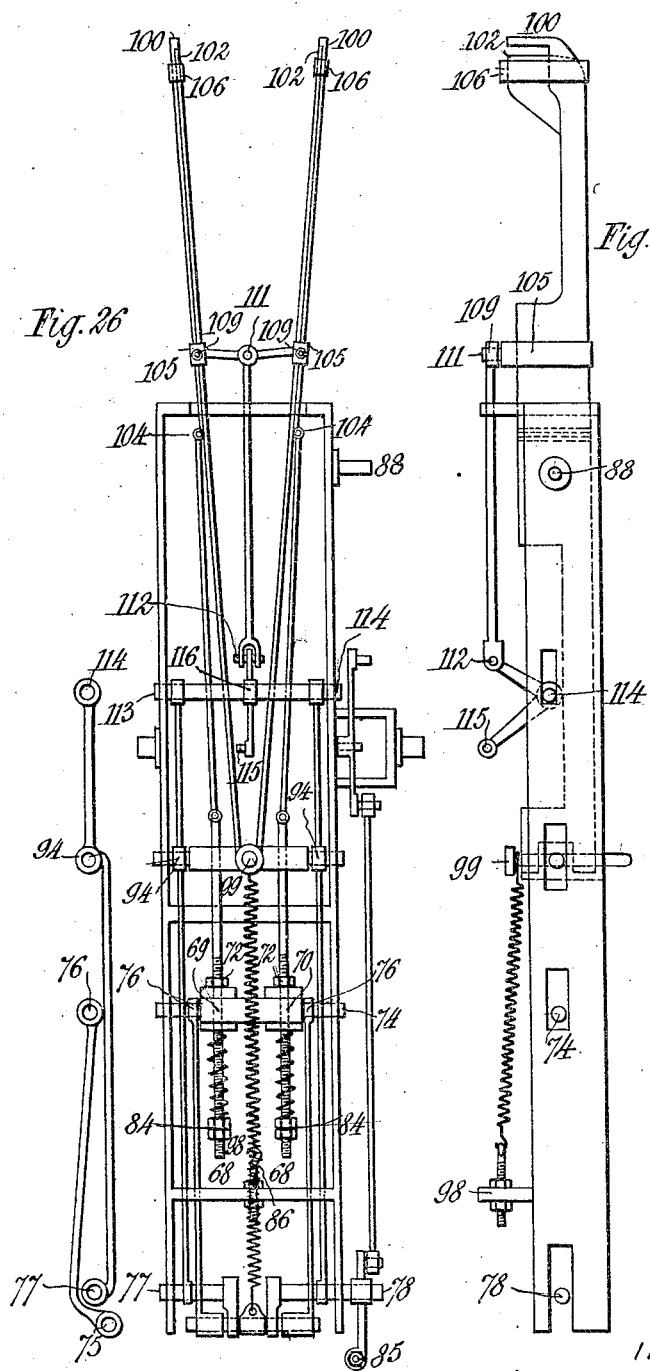

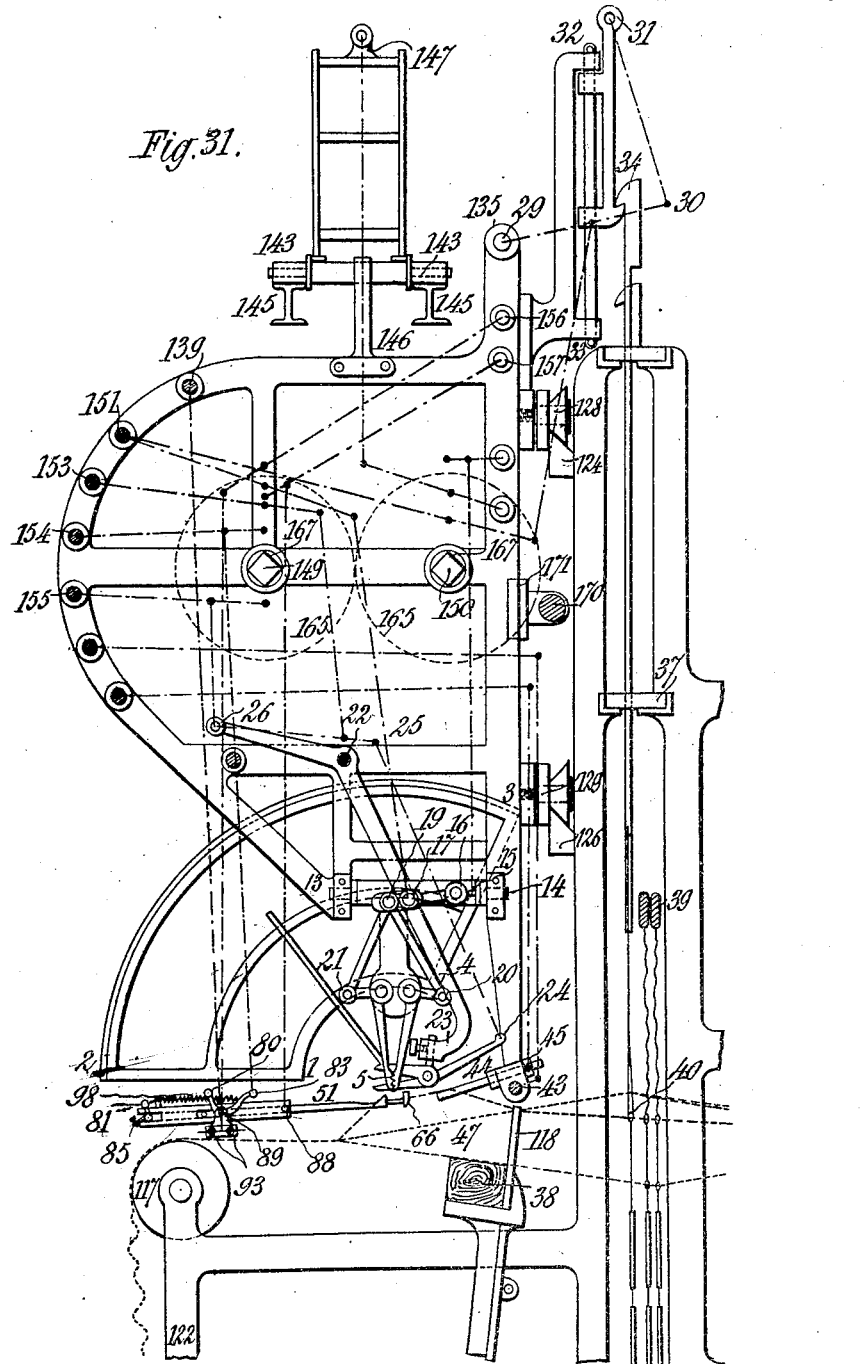

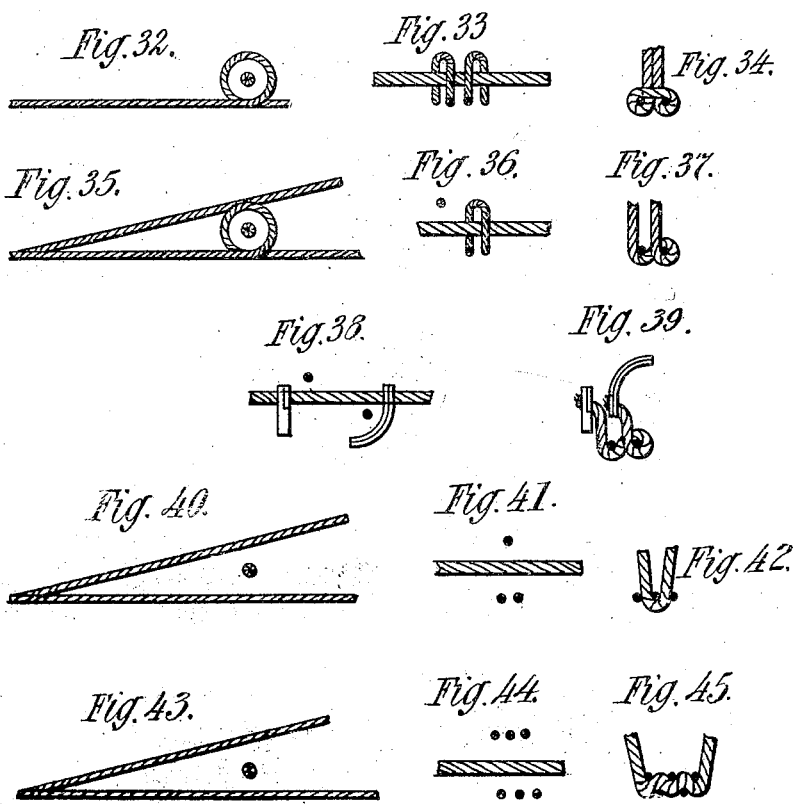

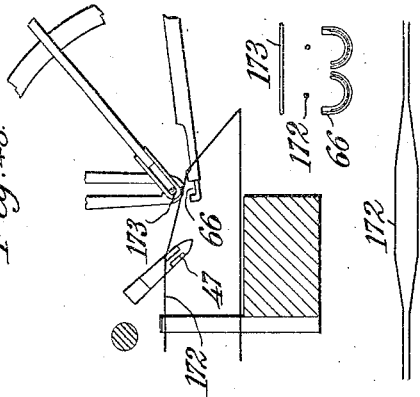
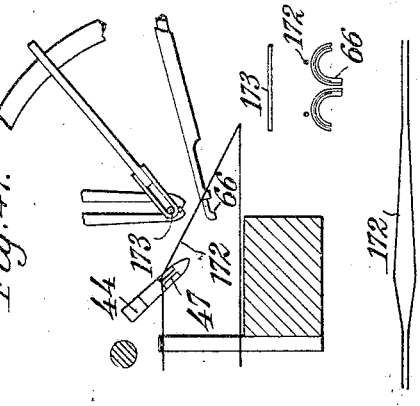
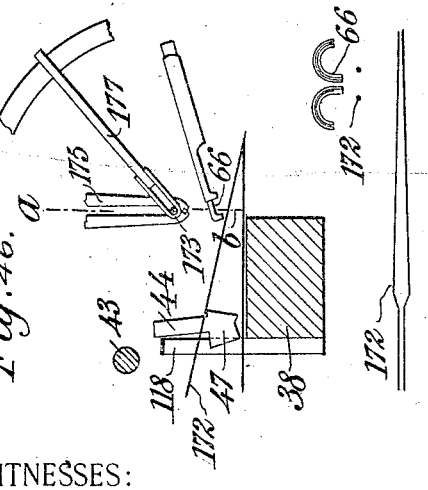
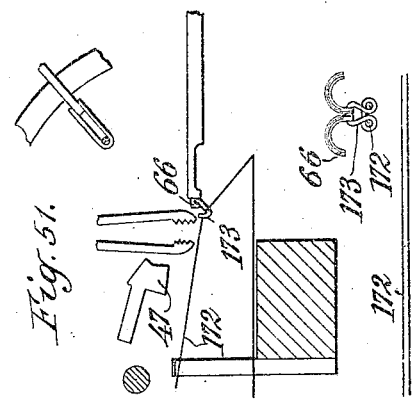
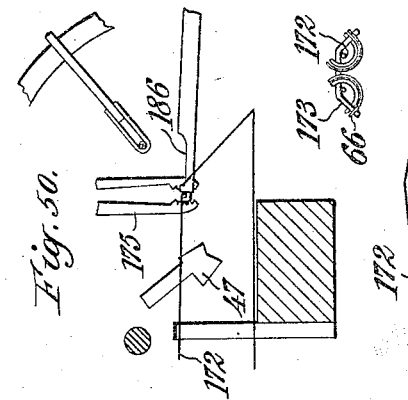
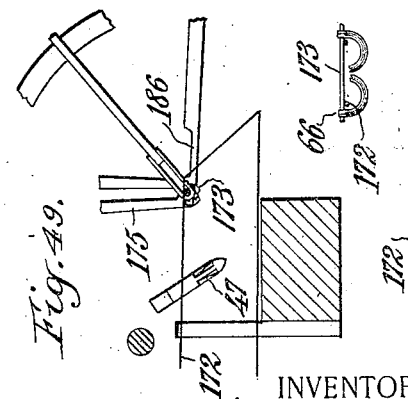

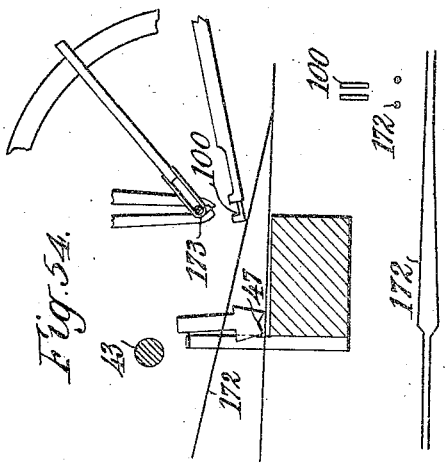
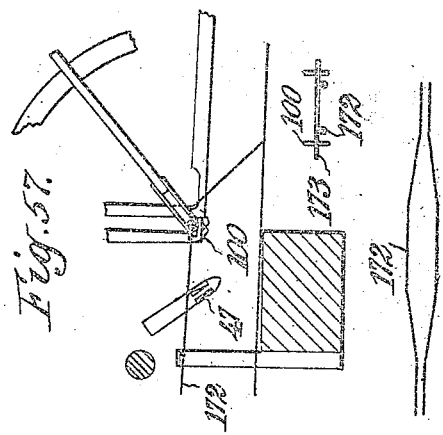
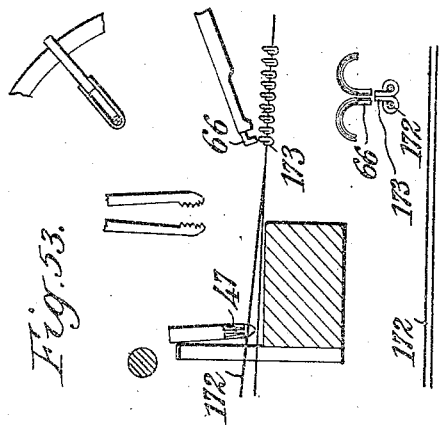
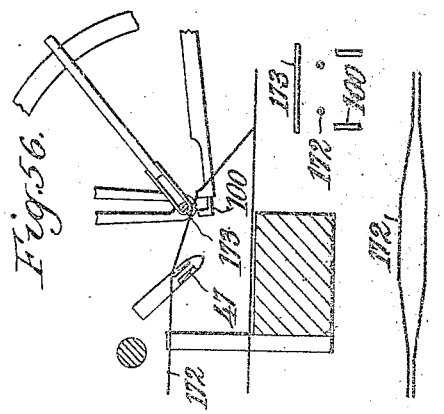
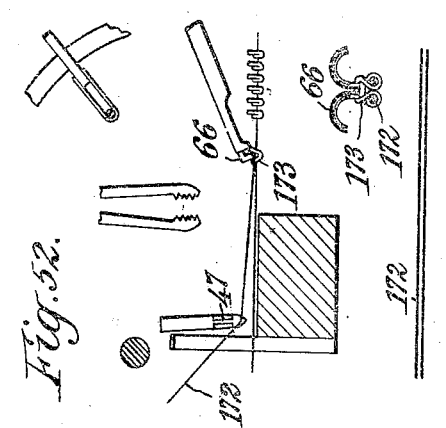
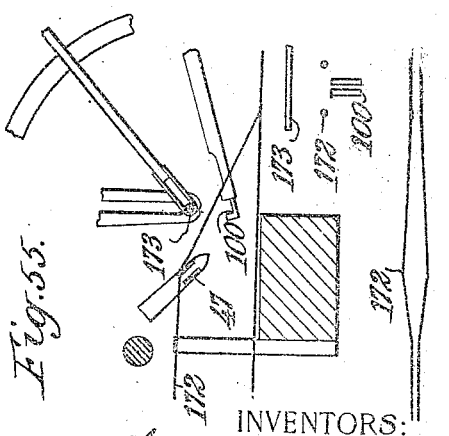

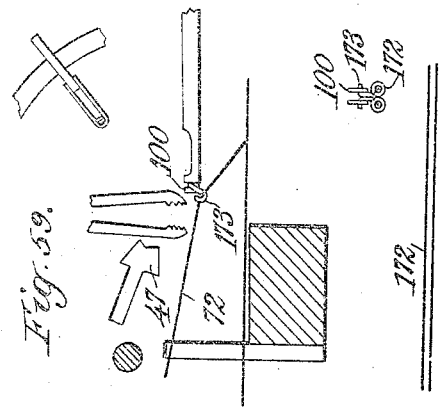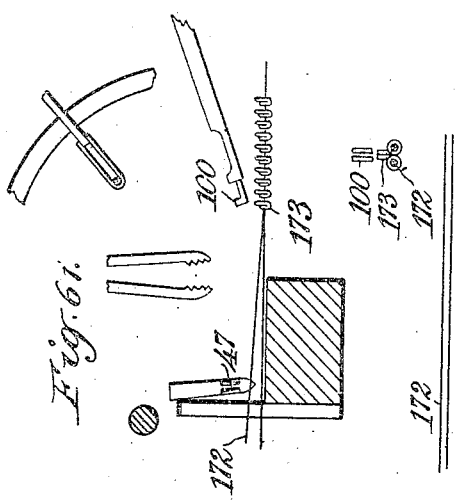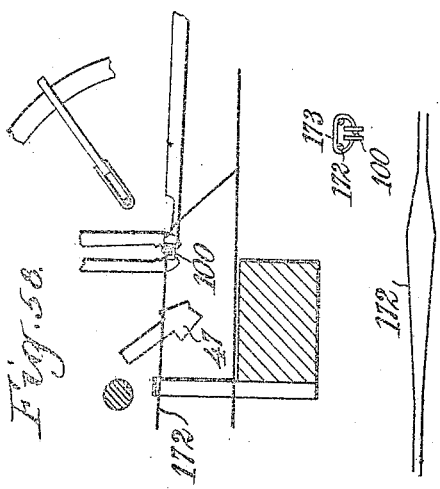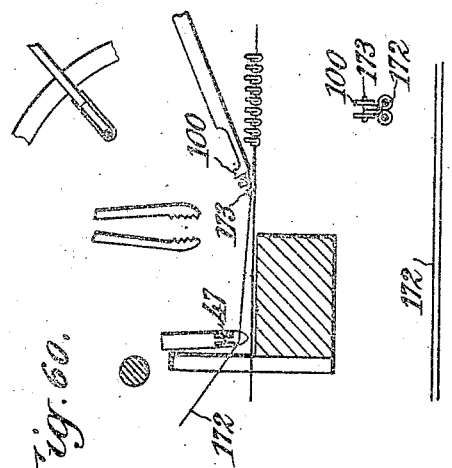

UNITED STATES PATENT OFFICE.

CHARLES RENARD AND ALBERT RENARD, OF NONANCOURT, FRANCE.

POWER-LOOM FOR THE MANUFACTURE OF TUFTED PILE FABRICS.

No. 894,287.                    Specification of Letters Patent.           Patented July 28, 1908.

Application filed August 17, 1906. Serial No. 331,060.

*To all whom it may concern:*

Be it known that we, CHARLES RENARD and ALBERT RENARD, citizens of the Republic of France, residing in St. Lubin des Joncherets pour Nonancourt, Eure, France, have invented certain new and useful Improvements in Power-Looms for the Manufacture of Tufted Pile Fabrics, of which the following is a specification.

This invention relates to power looms for the manufacture of oriental, Persian wound and other knot-stitch carpets. This loom comprises on the one hand the ordinary weaving loom proper with the beam and take-up roller, its pickers its reed, its batten, shuttles and mechanism for regulating or actuating its parts; and, on the other hand, the combination of mechanism which coöperate to form the knot. In the loom proper the heddles are of peculiar design hereinafter described in full and due to the special operation which is required of them. The weaving loom and the mechanisms for forming the knot are set going by independent drives and work alternately one after the other.

In the following description the arrangement, the purpose and the working of the various parts are first separately explained and afterwards the description is given of the combination of these various parts to constitute the loom for manufacturing the knot-stitch carpets which is the subject of the invention.

Referring to the drawings illustrating embodiments of the invention—Figure 1 shows in juxtaposition an elevation and a cross-section on the line X—Y of a distributer for the pile yarns. Fig. 2 is an elevation of the distributer with pile yarn carriers in place. Figs. 3 and 4 are respectively an edge and a side elevation of a pile yarn carrier. Fig. 5 is an elevation of the distributer, showing only the carrier which is in operative position, together with the gripper for drawing the end of the pile yarn from the carrier, and the shears for cutting off the pile yarn. Figs. 6 and 7 are respectively a plan and face elevation of the body of the gripper. Figs. 8 and 9 are alternative forms of a guide for the pile thread. Fig. 10 is an elevation of an alternative arrangement of the distributer. Figs. 11 and 12 are respectively a front elevation and a sectional view of the batten and healds and connected parts. Fig. 13 is a plan view of a row of the hooks shown in Fig. 12. Fig. 14 shows in juxtaposition an elevation of a divider and tightener of the warp threads in two successive positions, and a cross-section of the same. Figs. 15 to 18 inclusive illustrate the successive positions of the divider and tightener. Figs. 19 and 20 are respectively a plan and a side elevation of a looper, a diagram being arranged in juxtaposition to Fig. 19 to show means for rotating the parts. Fig. 21 is a diagram indicating the relative positions of certain parts of the looper. Figs. 22 to 25 inclusive are diagrams illustrating the successive positions of the grippers of the looper. Figs. 26 and 27 are respectively a plan and a side elevation of an alternative form of looper, a diagram of certain links being arranged in juxtaposition to the former figure. Figs. 28 and 29 are diagrams showing the successive positions of the gripper of an alternative style of looping device. Fig. 30 is a front elevation of the loom. Fig. 31 is a vertical section thereof showing the pile-forming portion in side elevation. Figs. 32 to 45 inclusive illustrate different styles of knot which may be formed with the machine of this invention. Figs. 46 to 53 inclusive are diagrams illustrating the successive positions of the several parts of the apparatus, supposing the looper of Fig. 19 to be used; each figure including in juxtaposition a vertical section parallel with the looper, a cross-section on the thread 173, and a plan of the two warp threads under consideration. Figs. 54 to 61 inclusive are similar views showing the operation of the apparatus in connection with the looper of Fig. 26.

I.—*Distributer.*

The pile yarn carriers are actuated by a jacquard, and are arranged radially so that the distributer occupies only a small space.

Fig. 1 shows in elevation and in section through X—Y the frame of the distributer 1, 2, 3, 4 having grooves made radially in order to receive the pile-yarn carriers.

In Fig. 2 is shown the distributer with its carriers one of which is moved to its farthest limit at 5 which is the center of convergence and distribution.

Figs. 3 and 4 show separately details of construction of a distributing pile carrier.

A thin and strong carrier 6, 7, is held in the grooves of the distributer by the arcs 3, 4; it is provided at the bottom with a piece of sheet metal bent and riveted on to the carrier forming a guide for the passage of the pile thread, the tension and the holding of which are regulated by the pivoted catch 8 and the spring 9; at the top is arranged the pulling cord of the jacquard guided by the roller 10 and fixed to the carrier; a spring fixed to the arc at 11 and to the carrier at 12 brings back the carrier as soon as the jacquard has ceased its pull.

Fig. 5 is a complete view of the distributer, its gripper and its shears. The gripper is supported upon a bar shown separately at Figs. 6 and 7, which rocks upon pivots 13, 14, the oscillation being regulated to the length of the pile thread by a cam and lever acting upon the pin 15. The gripper opens or closes under the action of a slotted lever having a rocking-center 16 and driven by a cam and a lever extending to the pin 17; then in the same slot, a pin 19 acts through the rods 19, 20, 19, 21 on the arms of the gripper for seizing the pile thread brought by the carriers to center of distribution 5. The shears, mounted upon an arm pivoted at 22, have their upper blade fixed and formed with a pin 23 serving to fix them and to regulate their height; the lower movable blade receives its movement through a rod 24, 25 actuated by a cam. The arm carrying the shears and oscillating at 22 is actuated at 26 by a cam so as to bring the shears near to the center 5 to there cut the pile thread at the required moment. This displacement has for object to give free passage to the ends of the pile thread extending beyond the carriers and also to allow the gripper to freely come and seize them but is not indispensable in all cases.

In certain stitches which will be referred to the distribution is effected through loops in the warp either by a guide, the end of which is bent back and extended (Fig. 8) or by a tubular guide (Fig. 9) mounted on the distributer rocking upon pivots 27, 28 (Fig. 10). In the latter case (where the distributer is arranged to rock) the arms of the gripper have only one movement, that which permits the seizing and holding tight of the pile thread, and the rocking movement upon the pivots 13—14 (Fig. 5) is suppressed.

It will be seen from Fig. 8 and from the further description hereinafter that the pile thread can be seized by the looper on one side or the other of the gripper. This detail is applied according to the length of the pile thread to be used.

II. Lifting and Way of Acting of the Two Warp Threads.

Each warp thread is actuated by a heald which is tightened to the hook of a special jacquard mechanism. The latter is actuated by the knotting system. These healds are fixed to rods which are connected with the weaving loom, so that each warp thread may be at first lifted by the jacquard, for the tying of the knot; then all the warp threads may be lifted by the weaving heddles for the weaving. The two warp threads on which the knot stitch has to be produced are not only lifted, but they help to the formation of the knot by their different positions to which they are brought. These successive positions constitute the whole work of the warp threads, and they may be thus explained: They are (1) lifted; (2) separated from each other; (3) divided to allow the passage between them of the looping grippers; (4) lifted by the looper close to the pile thread of the distributer; (5) then brought towards their natural position and distance apart for the tightening of the knot; (6) then strained for the sliding, the putting in place and the locking of the stitch; and (7) at last lowered to the position of the other warp threads. Figs. 11, 12 and 13 show the details of construction for the raising of one warp thread. A hook 34 lifts successively one after another the bifurcated healds 40, 41. These healds thus produce the lifting of the two warp threads 185, 185. This mechanism may be adopted instead of a special jacquard for the lifting of the warp threads.

A row of looped healds or leashes is placed throughout the width of the warp; the number of these healds is equal to the dents of the reeds and half that of the warp threads. They can be actuated directly by a jacquard or each suspended from a hook all together constituting with the row of hooks a jacquard mechanism of the width of the warp and the inverted hook of which being laterally displaced to successively lift hook by hook produces the same effect as the needles and cards of the jacquard. The object of these healds is to successively lift together the two warp threads which are entered in each loop and on which the knot should be set and which, on passing through the reed are separated by a dent. This loop is sufficiently high to allow the crossing of the two warp threads to take place under the action of the heddles of the weaving loom and in which they are entered thread by thread; reciprocally, the loops can raise the two threads by reason of the peculiarity mentioned of the leashes, as the latter are not connected at their upper parts and have leads suspended from their leashes or threads. These arrangements therefore allow alternately either the action of the healds with loops for raising two warp threads, or the action of the weaving heddles on all the warp threads at once for weaving. Many other arrangements could be employed without in any way altering the process of separating the two warp threads on which the knot stitch is produced.

Fig. 12 shows the hook 31 which is an inverted hook adapted to lift the other hooks; the shaft 29 which receives its movement from a cam and lever, transmits by the levers 29, 30 and 30, 31 the lifting and lowering movements to the hook mounted on the guide rod 32, 33; the hook 34 is lifted to its extreme limit; its downward motion is limited by the shoulder 35 abutting upon the guide bracket 36 which, with the guide bracket 37 directs the course vertically; divisions are made in these guides to keep the hooks at equal distances apart as shown in the plan view of the row of hooks, Fig. 13.

Figs. 11 and 12 show the batten 38 and the strips 39 of the weaving loom; the raised loops 40 and the lowered loops 41, and the leads 42 of the heads.

III.—*Divider and Tightener of the Warp Threads.*

The divider and tightener of two warp threads has for object to separate them for the passage of the looping grippers which will be hereinafter described and to tighten them for the locking and placing in position of the knot-stitch. This divider is shown in front and side view at Fig. 14. This apparatus is fixed on the shaft 43 which moves it in its alternate rocking movements obtained by cam and lever, the piece attached to it serves at the same time as a bearing for its pivot 44. The crank 45 imparts to it a movement of rotation of a quarter of a revolution by means of a rod acting upon the pin 46 and driven by cam and lever. The front view shows at its lower end and in its axis an angular notch 50 wherein the two warp threads are shown in section. This is the position they occupy for their tension. The side elevation shows at this same end a point 47 slightly rounded and also, in section, the two warp threads. This is the position for effecting their separation.

In Fig. 15 the divider and tightener is supposed to be lowered, its point 47 is brought towards the dent of the reed which separates the two warp threads. The latter are about to be lifted and pass on each side of the point 47, the shaft 43 slightly lifts the divider, its crank causes it to make a quarter of a revolution and the whole stops, Fig. 16.

By reason of the shape of the divider, the two threads are not only divided but strained and retained by the shoulders 48, 49, Fig. 14; this is the position which allows the looping grippers to pass between the threads in order afterwards to turn round them to take up the pile thread which is at this moment distributed and held in tension between the distributer and its gripper. As soon as it is ized by the looping device it is cut by the shears, released by the gripper taken up and drawn along. At the same time, the divider and tightener is lowered and turned back its quarter of a revolution, raised in order to disengage it from the two warp threads, turned back its quarter of a revolution, and lowered on to them to arrive and take the almost vertical position shown in dotted lines in Fig. 17. As the warp threads are then brought towards their natural position and distance apart they become united in the angle 50 of the divider and tightener (Fig. 17); the tension is so much greater as the lift of the heald loop is still maintained which offers for the sliding the putting in place and the locking of the stitch, the best advantages for execution. The stitch being completed the divider and tightener slightly rises comes back its quarter of a revolution, the hook and its heald fall, the lateral advance of the system is effected, the divider and tightener resumes its first position, Fig. 15, but its point is now over the adjacent dent of the reed and so on. In certain divisions of the reed in order to further insure the concordance of the dent of the reed and the point 47 a small notch or slot 50$^a$ can be made in the divider and tightener as shown in the section at Fig. 14 which fits over the said dent 50$^b$. Other mechanical arrangements would answer the purposes of the described apparatus; it could also be separated into two apparatus the tightener and the divider and this arrangement would in no way alter the process which is; (1) to sufficiently divide, as required upon the movement of the reed, the two warp threads for the passage of the looping grippers; (2) to strain the two threads to permit the sliding and the perfect forming of the knot.

4. *Looping Device.*

In principle it consists of two grippers which serve to seize the pile thread as it is distributed and not to leave it until after the placing and final locking of the stitch whatever kind of knot may be made. But as the different knot-stitches result from the path followed by the ends of the two grippers carrying along the pile thread in combination with the warp threads, it is possible to obtain them by causing these ends to perform rotary movements or rectilinear movements; these are unimportant details of the mechanism but cannot be ignored as they are capable of furnishing the same results. They are explained by the three following examples; (a) Looping device with grippers having rotary movements. (b) Looping device with grippers having rectilinear movements. (c) Mixed looping device, that is to say, arising from the two others.

(a) *Looping device having grippers with rotary movements.*—Fig. 19 is a plan view of it and Fig. 20 is a side view. This device consists of two tubes 51, 52 of equal diameter and parallel, passing through guides 53, 54. They work together in their alternate rotary movements through the medium of two pinions 55, 56 keyed on the tubes; the pinions gear together and are driven by the sector 57 rocking upon its pivots 58·59 and receiving its movement on the pin 60 through a cam and lever. (The parallelism of the tubes is not an essential question, because for making very short piles which require the employment of tubes of small diameter they are placed slightly converging and only tangential at the end 66 in order to allow of employing pinions of larger diameter.) Each of these tubes, retained by shoulders in the bearings 61, 62, contains an inner tube sliding in the former, the pins 63 fixed on the lower tube secure them together for the rotary movement but the slots 64, 65 allow the longitudinal movement which corresponds to the opening and closing of the grippers, which are formed by the meeting of the two outer and inner tubes according to the arrangements shown at 66; moreover they are slotted or notched in order to effect the passage of the warp threads shown at 172. The inner tubes are formed integrally at 67 with the screw-threaded rods 67, 68 which pass over the brackets of the trunnions 73, 74, the sockets 69, 70 of which with rings serve as stops for the springs 71 and nuts 72. The rods and the inner tubes therefore have the same rotary movement and are actuated longitudinally by the cross piece 73, 74 which receives its movement through connecting rods 75, 76, actuated by the crank 79 of the shaft 77, 78 which carries at the end the crank 78, 81 forming part of the bell-crank 81, 82, 85. The pin 81 is driven by the connecting rod 81, 80 actuated by the double lever 80, 83 receiving at 83 the motion of a lever and cam. The springs 71 placed on the screw-threaded rods 67, 68 regulate, through the nuts 84 and 72, the energetic and equal grip of each of the grippers. The grippers have their maximum grip when the centers 76, 77, 75 are in a straight line, which is subjected to a slight movement past the same below the center, Fig. 21, in order to insure the grippers being held closed, the closure being regulated by the screw placed at 85 Figs. 19 and 20, which under the action of the spring 86 bears upon the inclined plane 87. The spring 86 is fixed to the top of the piece 96, 96 and is there adjustable. All these pieces are held in the frame 91, 53, 54, 92 suspended above the pile of the carpet by the two shafts 93 which are themselves connected to a rocking lever actuated by a cam; at the same time that they have their oscillation in the direction of the warp, the tubes rock upwards with the frame upon its pivots with horizontal axis 89, 90 which receives its movement through a rod connected to the pin 88 and actuated by a cam.

The two rocking movements of the looping grippers are thus insured and their action combines with that of the other apparatus already described: (1) Fig. 22, they enter between the two warp threads lifted by the healds with bifurcations or loops separated and held by the divider and tightener; (2) Fig. 23, they pass round them; (3) Fig. 24, they seize the pile thread brought by the distributer and cut at the same moment by the shears, and then loosed by the gripper of the distributer; (4) Fig. 25, the looping grippers retrace their semi-circular movement which they have just performed which forms the loop in the pile thread, draw it along, lock it in the weft line of the weaving for finishing the knot-stitch. In these movements and in these courses the ends of the two grippers have followed, through their double oscillation, all the upward and downward evolutions of the two warp threads.

It is at the moment of meeting of the knot with the wefting line of the weave that the automatic locking is produced. The brackets 61, 62 and the shaft 77, 78 (Figs. 19 and 20) are connected by rods or bars 94, 95. The ends of the brackets 61, 62 and the shaft 77, 78 slide in the slots 96ª and 97 and are held at the bottom of their travel by the spring 98, 99 fixed at 99 to the piece 96, 96 and adjustable at 98 on the fixed part of the frame; under the resisting action of the knot being tightened the two grippers firmly gripping the pile thread by each of its ends are there held, the frame continues its backward movement but the retaining force becoming greater than the resistance of the spring 98, 99, the tubes slide in the guides 53, 54 drawing along the piece 96, 96, the bars 94, 95, the shaft 77, 78 and consequently the bell-crank 81, 82, 85 and an adjusting screw placed at 85, the end of the latter meets the inclined plane which, raising it, prevents the slight movement beyond the straight line shown at Fig. 21 which insures the closing of the two grippers; immediately the tension of the spring 86 acts by rocking on the crank 79 and suddenly and automatically effects their opening through the connecting rods 75, 76 acting upon the brackets of the shafts 73, 74. At the same time the grippers come back to their fixed position where they were first described, under the action of the spring 98, 99. The opening of the grippers is thus effected under a pulling force which is always equal for the tightening of each stitch and with a very great speed avoiding the raveling of the pile thread.

Other automatic or positive mechanical means can be employed for opening the two grippers but automatic means are preferable by reason of the regularity obtained and also because they allow of treating as negligible the differences which may be produced in the wefting line of the carpet, the variations of positions of which may be somewhat appreciative. It is therefore preferable to act automatically as indicated by the arrangement which has been described as an example.

In the last description is related that the two looping grippers are actuated by two pinions 55, 56, which gear together and are driven by a sector 57. These two grippers thus work together under the action of the said sector in order to produce the oriental knot-stitch, as explained for Figs. 22, 23, 24 and 25; but in order to obtain the Persian knot-stitch (Figs. 28 and 29) the two looping grippers have to work quite separately; therefore the two pinions have only to be slightly displaced sidewise, so that they do not gear together. Each of these pinions receives its motion by a special sector, each of these sectors being actuated by special cam and lever. By these means it is easy to understand that all movements or stops may be obtained for each gripper, as desired, in order to produce all sorts of stitches; oriental, Persian, wound stitches, and even for pile threads distributed and brought to the wefting line, in order to maintain it, by weaving in a ground texture.

(b) *Looping device with grippers having rectilinear movements.*—The two grippers of this device comprise the same frame as that before described; they have the same automatic movement, the same closing and opening arrangement, similar arrangements of their ends and also of the slots or notches for the passage of the warp threads; the same looping result as above is obtained. Only, as shown in Fig. 26, in place of the tubes sliding one within the other, flat bars or strips 99, 102 and 104, 100 are employed sliding one alongside the other in guides 105, 106, and which form at their end the grippers 100, 102. The bars or strips 99, 102 rock upon their pivot 99 in order to allow the ends of the grippers to approach or move away from each other; this movement is obtained by the links 111, 109 actuated by the rod 111, 112 and the double lever 112, 116, 115. The pin 115 is actuated by a cam. The opening and closing movements of the grippers are obtained by the mechanical arrangements before described and which are connected at 104. The looping is effected in the same order explained for the rotary looping grippers: (1) They enter, adjacent to one another, between the two warp threads; (2) they separate below, rise and force the warp threads to take their position in their slots or notches; (3) they seize the pile thread; (4) they perform their return movement, draw along and lock the stitch at the wefting line

V. *Complete loom.*

Fig. 30 is a front elevation and Fig. 31 a side elevation. It comprises the take up roller 117, the batten 38, the reed 118, the heald strips 39 and the frames 119, 120—121, 122 (Fig. 30) of the weaving loom (frame incompletely drawn, Fig. 31 in order to better illustrate the mechanism of the system.) These frames are extended in height and are connected by the cross bars 123, 124—125, 126 serving as ways or rails for the carriage designated by the four rollers 127, 128, 129, 130 and on which are fixed the frames of the independent mechanism 131—132, 133—134, 135—136 which it draws along in its lateral movement. These frames support all the apparatus of the independent mechanism with the cams, the shafts and the levers; the looping device fixed to its shafts 93, with its supports 137, 138, 139—140 which oscillate upon the suspension shaft 139—141; the distributer 1, 2, 3, 4, a carrier lowered at 5, its gripper actuated at 20, 21; its shears 23, 24 (not shown in Fig. 30); the divider and tightener 47 and its operating shaft 43 (the means for setting the distributer are also not shown, the latter being held like the gripper and the shears on the frame 135, 136). All these apparatus are now illustrated wherein the distribution of the pile thread is effected, the looping grippers slightly lift the two warp threads in order to afterwards seize the pile thread and loop it. At the upper part is shown the jacquard which actuates the carriers of the distributer rolling with its rollers 142—143 upon the rails 144—145 which are supported by the frames of the weaving loom (frames not shown in Fig. 31). The jacquard is connected to the independent mechanism for its lateral movement by the foot 146 fixed to the frame 135, 136. The hook is shown at 31, its guide at 32, 33, the row of hooks at 34; the healds with loops at 40. Finally the driving shafts 149 and 150 on which are fixed all the cams driving the different movements of the apparatus, the shafts 158, 156, 159, 157, 160—151, 161—153, 162—154, 163—155, etc., serving as attachments and gear to the levers transmitting the movements of the cams.

VI.—*Lateral Movement.*

The two driving shafts 149 and 150 revolve at equal speeds by means of two toothed wheels 165 of the same diameter and gearing together; one of these wheels receives by means of a pinion and shaft not shown the motion of the transmission gear which from that time is given to all the system. These shafts 149 and 150 are round and are joined at 166 to square shafts 167. The toothed wheels 165 are adjusted to slide freely upon these squares, but are supported by their sockets passing through two frames 107—107 and in which they turn (shown only in the front view Fig. 30) which are fixed on the ways 124 and 126 so that the square shafts turn with the toothed wheels and slide in their socket. A screw 170 fixed on the carriage by the piece 171 effects the lateral movement of the carriage and consequently that of the independent mechanism; this movement is given by pawls and ratchet wheels between two stops and forming a nut on the screw (not shown) which effects the motion of the carriage in both directions.

VII.—*Multiplicity of Systems.*

The part comprised between the frames 131, 132, 133, 134, Fig. 30 is the head of the independent mechanism in that it incloses, fixed on the driving shafts, all the cams transmitting through levers all the different movements corresponding to their outlines to the shafts 158, 156, 159, 157, 141, 139, 160, 151, 161, 153, 162, 154, 163, 155 etc., equal in number to that of the movements of the independent devices of the mechanism. It follows that in the width of a loom the number of distribution and locking members can be repeated such number being only limited by the space available.

The described mechanism with its arrangements and members produces all the stitches which have been indicated and it will be well to revert to them in order to describe their formations.

(1.) *Oriental notch stitch.*—Produced by the looping of the pile thread. It has been explained in describing the working of the looping device with grippers having rotary movements, Figs. 22, 23, 24 25 and also that with grippers having rectilinear movements.

(2.) *Oriental knot stitch.*—Produced by the looping of the warps, Figs. 32, 33, 34. The means of looping the warps, their twisting and their reversibility are known, and are not part of this invention.

(3.) *Persian knot.*—It only requires the looping of a single warp, the distribution is effected below the first warp thread and in the loop of the second, the grippers with rotary movements or those with rectilinear movements operate as above, Figs. 36, 37, 38.

(4.) *Persian knot.*—It is also produced by the loopings of the pile thread, the distribution is effected between the two warp threads lifted to different heights, Fig. 39; the pile thread is held at the side of the warp thread on which it is distributed and is wound over the other, (Fig. 40) by the mixed gripper.

(5.) *Wound knot.*—Is produced on one or two warp threads, the grippers with rotary movements pass round each warp thread one or more times before seizing the pile thread and the same return movements produce the winding or wound knot.

(6.) *Knots tied by weaving.*—Figs. 41, 42, 43, 44, 45 and 46. The distribution is effected in the lift of one or more warp threads, the grippers have only to seize the pile thread and to close as required, to draw it up to the crossings of the warp threads which crossings it embraces and is held therein. These crossings are all that are required for obtaining a more or less firm hold of the knot.

In this description the combination of the whole of system is explained; but it is obvious that in certain cases certain parts of the whole arrangement can be modified. Moreover this manufacture and the apparatus which has been combined for carrying it out allow of obtaining carpets with different knots oriental, Persian, or held by crossings or suitable arrangements arising from the warps and weaving. Also carpets of all kinds can be manufactured reproducing designs of different kinds in various colors with all pure or mixed textiles.

The described mechanisms may be adapted to weaving looms with vertical warps instead of with the horizontal warps shown.

The relative movements of the parts in the manipulation of the warp threads and the forming and drawing of the loop or knot, will be understood most clearly from reference to Figs. 46 to 53, or Figs. 54 to 61.

In the first position the divider and tightener 44 has entered between and slightly separated the lifted warp threads 172. The loop gripper 66 rests above the warp threads. The pile yarn carrier 6, 7 is moved to the operating center and the end of the pile yarn is gripped by the grippers 175 and so held above the loop gripper.

In the second position the divider and tightener 44 has lifted the warp threads 172 so that the looper 66 lies below them, the other parts being approximately in the same positions as before.

In the next position the two grippers of the looper have rotated in opposite directions, and the end of the looper has been raised, carrying with it the warp threads.

In the next position the same movement has continued until the gripping jaws of the looper have taken hold of the pile yarn 173, the shears being operated to cut off the necessary length. In the following position the gripper 175 has released the pile yarn, the carrier 6, 7 has returned to its original position, the loop grippers 66 are in the act of returning to their starting position, and so also is the divider and tightener 44.

In the next position the loop grippers pull the ends of the knot up through the warp at the same time that the divider and tightener 44 rises clear of the warp.

In the next position the looper still gripping the ends of the loop draws the latter along the warp to the wefting line, the divider and tightener 44 being turned and pressed down so that its notch holds the two warp threads together and draws them tight to permit the free sliding of the loop.

In the next position the loop is shown in final position, and all the parts ready to commence a new operation.

What we claim is:—

1. In a loom for weaving a tufted fabric, in combination, a distributer in the form of a sector fixedly mounted, pile thread carriers arranged radially in said distributer and movable to and from the center, a feeding gripper adapted to grip a pile thread at the center of the sector, and shears adapted to cut off the pile thread, all these parts being arranged above the warp.

2. In a loom for weaving a tufted fabric, a distributer including in combination a circular sector with grooves, radially movable carriers supported in said grooves and terminated by a guide for directing the pile thread, means for bringing each carrier to the center of the sector, a counteracting spring bringing it back to its normal position, and a spring presser connected with the guide and which gives to the thread the required tension while allowing its advancement in one direction.

3. The combination with a weaving loom, of healds, hooks from which said healds are suspended, means for lifting said hooks and healds successively, a carriage moving transversely across the front of the loom and carrying the means for lifting the hooks, and means also carried by said carriage for forming pile knots.

4. In a pile fabric loom, in combination, a divider with an angular notch at its lower end, and means for lowering said divider to cause said notch to engage and put a tension on the warp threads.

5. In a loom for weaving a tufted fabric, in combination, a looper, means for withdrawing two adjacent warp threads from the plane of the warp and separating them laterally from each other, and means for introducing the looper between said threads while so withdrawn and separated.

6. In a loom for weaving a tufted fabric, in combination, a looper, means for dividing two adjacent warp threads, means for introducing the looper between said threads while so divided, means for moving the looper to form the loop and then to draw it to the wefting line, and means for holding the warp, during the forming and drawing of the loop.

7. In a loom for weaving a tufted fabric, in combination, a shaft 44, means for oscillating said shaft about its own axis, a member at the lower end of said shaft having a point 47 adapted to enter between two warp threads in order to separate them, and having a notch 50 transverse to the edge of the point 47 and adapted to embrace two warp threads, and means for moving said member into and out of engagement with the warp threads.

8. In a loom for weaving a tufted fabric, in combination, a shaft 44, means for oscillating said shaft about its own axis, a member at the lower end of said shaft having a point 47 adapted to enter between two warp threads in order to separate them, and having a notch 50 transverse to the edge of the point 47 and adapted to embrace two warp threads, means for moving said member into and out of engagement with the warp threads and oscillating it to alternately separate and embrace them, a looper, means for passing the same through the weft when the threads are so separated, and means for moving the looper to form the loop and draw it up to the wefting line when the warp threads are so embraced.

9. In a loom for weaving a tufted fabric, in combination, a looping device having a gripper, means for holding it in position to grip a pile thread, means for moving the gripper in a direction to draw the pile loop to the wefting line, and including a spring, and means controlled by said spring for releasing the gripper from the loop.

10. In a pile fabric loom, a looping device having a pair of grippers adapted to slide in the direction from front to back of the machine, and a spring for first holding them fixed and adapted to afterwards yield and permit the separation of the two grippers, in combination with an inclined plane, a bell-crank, means for carrying said bell-crank along in the sliding movements of the grippers and bringing it into engagement with said inclined plane to rotate the bell-crank, and means whereby the rotary movement of said bell-crank effects a sudden opening of the claws of each gripper.

11. In a loom for weaving a tufted fabric, in combination, a looping gripper, means for causing it to pass around a warp thread means for causing it to grip the pile thread, means for moving it to form the gripped pile thread into a knot stitch about the warp, and means for moving it to slide and lock the knot on the warp.

12. In a loom for weaving a tufted fabric, in combination, a looping gripper, a frame 91, 53, 54, 92 therefor, and a pair of shafts 93 by which the frame is suspended, said frame being pivoted on a horizontal axis 89, 90.

13. In a loom for weaving a tufted fabric, in combination, a looping gripper, means for causing it to pass around a warp thread, means for causing it to grip a pile thread after passing around such warp thread, and means for causing it to pass back around said warp thread to its starting position while gripping the thread.

14. In a loom for weaving a tufted fabric, in combination, a distributer, means for separating two adjacent warp threads, a looper adapted to receive the pile thread from said distributer, and means for operating said looper to draw the pile thread past the warp threads in one direction outside of and in the opposite direction between said warp threads to form the loop.

In witness whereof we have hereunto signed our names this third day of August 1906, in the presence of two subscribing witnesses.

CHARLES RENARD.
ALBERT RENARD.

Witnesses:
  HERNANDO DE SOTO,
  GABRIEL BELLIARDE.